US010718092B2

(12) United States Patent
Anheier et al.

(10) Patent No.: US 10,718,092 B2
(45) Date of Patent: Jul. 21, 2020

(54) COMPACT PAVER AND METHOD FOR OPERATING A COMPACT PAVER

(71) Applicant: BOMAG GMBH, Boppard (DE)

(72) Inventors: Thorsten Anheier, Kobern-Gondorf (DE); Thomas Haubrich, Goedenroth (DE); Thomas Klein, Wehr (DE); Andreas Roesch, Offenbach (DE)

(73) Assignee: BOMAG GMBH, Boppard (DE)

( * ) Notice: Subject to any disclaimer, the term of this patent is extended or adjusted under 35 U.S.C. 154(b) by 90 days.

(21) Appl. No.: 15/859,938

(22) Filed: Jan. 2, 2018

(65) Prior Publication Data

US 2018/0187383 A1    Jul. 5, 2018

(30) Foreign Application Priority Data

Jan. 2, 2017  (DE) .................. 10 2017 000 007
May 11, 2017  (DE) .................. 10 2017 004 553

(Continued)

(51) Int. Cl.
*E01C 19/22*  (2006.01)
*E01C 19/48*  (2006.01)
*B62D 51/02*  (2006.01)

(52) U.S. Cl.
CPC .............. *E01C 19/48* (2013.01); *B62D 51/02* (2013.01); *E01C 2301/40* (2013.01)

(58) Field of Classification Search
CPC ... E01C 19/22; E01C 19/4873; E01C 2301/40
(Continued)

(56) References Cited

U.S. PATENT DOCUMENTS 2,303,812 A * 12/1942 Barber .................. E01C 19/486
                                                                404/95
3,485,314 A    12/1969 Herr
(Continued)

FOREIGN PATENT DOCUMENTS

CN        2510529        9/2002
CN      101328810       12/2008
(Continued)

OTHER PUBLICATIONS

Notice of Allowance from related U.S. Appl. No. 15/859,929, dated May 14, 2019.
(Continued)

*Primary Examiner* — Thomas B Will
*Assistant Examiner* — Katherine J Chu
(74) *Attorney, Agent, or Firm* — Grossman, Tucker, Perreault & Pfleger, PLLC

(57) ABSTRACT

A height-adjustable operating platform of a compact paver comprising a machine frame, a drive motor, travel units, a receiving container at the front in relation to the paving direction for receiving paving material, a longitudinal conveying device with which the paving material can be conveyed from the receiving container in a rearward direction in relation to the paving direction, a transverse distribution device that is height-adjustable in relation to the machine frame and with which the paving material can be distributed on the ground surface transversally to the paving direction, a paving screed that is height-adjustable in relation to the machine frame for compacting and smoothing the paving material distributed on the ground surface behind the transverse distribution device in the paving direction, an operating platform mounted on the machine frame and arranged behind the receiving container in the paving direction and a method for operating a compact paver.

16 Claims, 10 Drawing Sheets

(30) Foreign Application Priority Data

Oct. 4, 2017 (DE) .......................... 10 2017 009 248
Oct. 4, 2017 (DE) .......................... 10 2017 009 249

(58) Field of Classification Search
USPC ........ 404/83, 118; 180/89.13, 326, 329, 330
See application file for complete search history.

(56) References Cited

U.S. PATENT DOCUMENTS

| | | | |
|---|---|---|---|
| 3,557,672 A | 6/1971 | Shurtz et al. | |
| 3,636,832 A * | 1/1972 | Schrimper | E01C 19/4853 404/84.2 |
| 3,874,807 A | 4/1975 | Puckett et al. | |
| 3,957,165 A | 5/1976 | Smith | |
| 4,192,525 A | 3/1980 | Clark | |
| 4,421,188 A | 12/1983 | Fredriksen | |
| 4,934,462 A * | 6/1990 | Tatara | F15B 21/08 172/2 |
| 4,995,469 A | 2/1991 | Mikkelsen et al. | |
| 5,086,869 A * | 2/1992 | Newbery | B60K 23/00 180/329 |
| 5,106,256 A | 4/1992 | Murakami et al. | |
| 5,215,403 A | 6/1993 | Peterson | |
| 5,533,829 A * | 7/1996 | Campbell | E01C 19/174 404/108 |
| 5,553,969 A | 9/1996 | Reed | |
| 5,664,909 A * | 9/1997 | Lindgren | E01C 19/26 180/326 |
| 6,276,749 B1 | 8/2001 | Okazawa et al. | |
| 6,560,952 B2 | 5/2003 | Velke et al. | |
| 7,159,687 B2 * | 1/2007 | Dunn | B62D 33/0633 180/326 |
| 7,243,756 B2 * | 7/2007 | Muraro | B60N 2/143 180/321 |
| 7,347,299 B2 * | 3/2008 | Billger | B60N 2/002 180/326 |
| 7,413,377 B2 * | 8/2008 | Pontano | E01C 19/48 404/101 |
| 7,540,685 B2 | 6/2009 | Avikainen et al. | |
| 7,997,369 B2 * | 8/2011 | Bacon | B62D 33/063 180/89.13 |
| 8,041,485 B2 * | 10/2011 | Prasetiawan | E02F 9/166 180/330 |
| 8,267,619 B2 * | 9/2012 | Munz | E01C 19/48 404/101 |
| 8,356,958 B2 | 1/2013 | Braun et al. | |
| 8,388,262 B2 * | 3/2013 | Klein | E02F 9/2004 404/83 |
| 8,590,983 B2 * | 11/2013 | Berning | B62D 33/0636 299/39.4 |
| 8,641,321 B2 * | 2/2014 | Eul | E01C 19/48 404/118 |
| 8,864,410 B1 * | 10/2014 | Kopacz | E01C 19/48 404/118 |
| 8,944,719 B2 * | 2/2015 | Frelich | E01C 19/00 404/108 |
| 9,045,871 B2 * | 6/2015 | Graham | E01C 19/4873 |
| 9,051,696 B1 * | 6/2015 | Coats | B62D 11/003 |
| 9,212,457 B2 * | 12/2015 | Wagner | E01C 19/42 |
| 9,249,544 B2 * | 2/2016 | Caputo | E01C 19/4833 |
| 9,592,758 B2 | 3/2017 | Mahler et al. | |
| 9,783,056 B2 | 10/2017 | Klein et al. | |
| 9,938,673 B2 * | 4/2018 | Ellwein | B60R 21/013 |
| 9,963,838 B2 * | 5/2018 | Oettinger | E01C 19/48 |
| 10,422,087 B2 * | 9/2019 | Anheier | E01C 19/48 |
| 2004/0190991 A1 * | 9/2004 | Quenzi | E01C 19/006 404/118 |
| 2005/0045409 A1 * | 3/2005 | Fenelli | B62D 51/001 180/326 |
| 2005/0069385 A1 * | 3/2005 | Quenzi | E01C 19/006 404/114 |
| 2007/0012498 A1 * | 1/2007 | Schulz | B60R 3/02 180/89.13 |
| 2008/0315666 A1 | 12/2008 | Von Schonebeck et al. | |
| 2010/0102609 A1 * | 4/2010 | Confer | B60N 2/24 297/335 |
| 2013/0264139 A1 | 10/2013 | Braun | |
| 2014/0216849 A1 * | 8/2014 | Ellwein | B60R 3/00 182/82 |
| 2014/0219721 A1 * | 8/2014 | Ellwein | E01C 19/48 404/83 |
| 2015/0078824 A1 | 3/2015 | Haro | |
| 2015/0217664 A1 * | 8/2015 | Levin | B60N 2/502 180/329 |
| 2016/0102439 A1 * | 4/2016 | Jorgensen | E01C 19/4873 404/118 |
| 2019/0078273 A1 | 3/2019 | Neisen | |

FOREIGN PATENT DOCUMENTS

| | | | |
|---|---|---|---|
| CN | 201530975 | 7/2010 | |
| CN | 101831861 | 9/2010 | |
| CN | 20324786 | 10/2013 | |
| CN | 104141274 | 11/2014 | |
| CN | 105083076 | 11/2015 | |
| DE | 20001246 | 3/2000 | |
| EP | 0314574 A1 * | 5/1989 | ............ E01C 19/20 |

OTHER PUBLICATIONS

Office Action from related Chinese Appln. No. 201711466757.X, dated Oct. 23, 2019. English translation attached.
Office Action from related Chinese Appln. No. 201711466700.X, dated Oct. 23, 2019. English translation attached.

\* cited by examiner

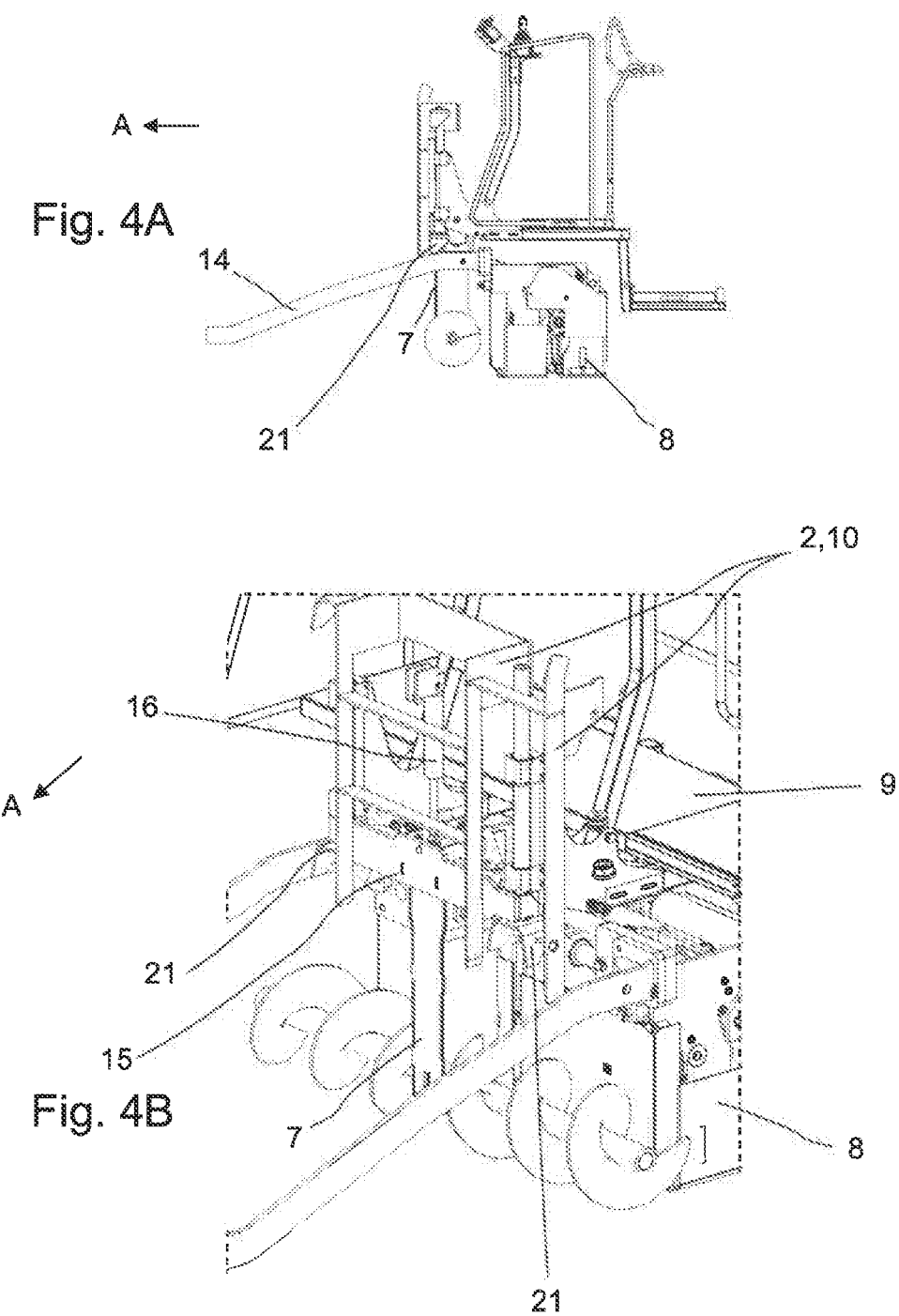

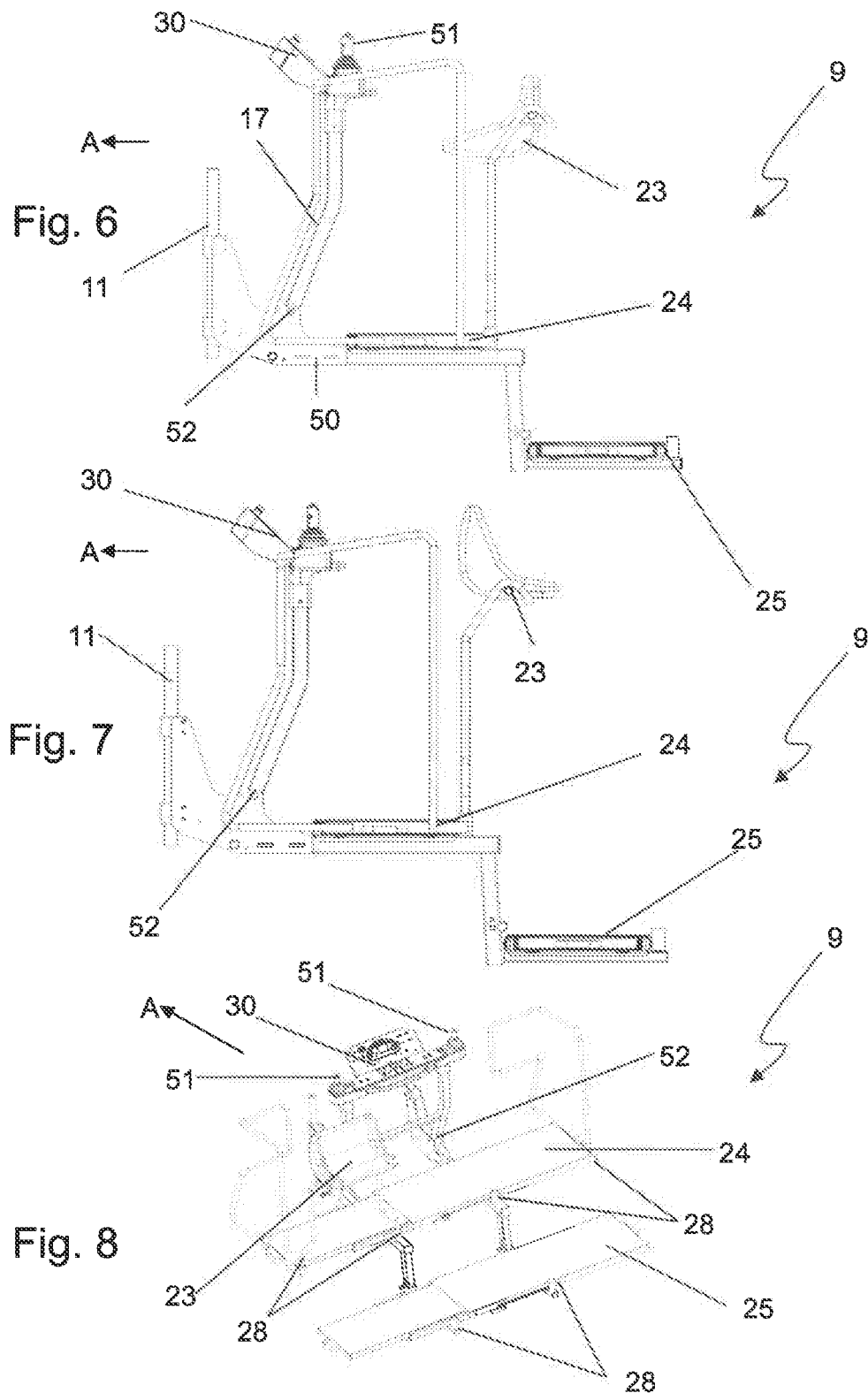

COMPACT PAVER AND METHOD FOR OPERATING A COMPACT PAVER

FIELD

The invention relates to a compact paver and a method for operating a compact paver.

BACKGROUND

Compact pavers constitute a sub-group of road pavers that are used in a known manner for paving material, e.g. asphalt or similar paving materials. Pavers with an operating weight (with an empty storage unit) of less than 10 tonnes and in particular less than 8 tonnes and/or a track width less than or equal to 1500 mm are commonly designated as "compact pavers". Compact pavers are used for paving surface materials, e.g. in spatially restricted working environments, particularly inside buildings and/or when the paving width is narrow, e.g. the width of an average sidewalk and/or a milled track. The applicant manufactures such a known compact paver e.g. under the type designation BF 223C.

Essential elements of a generic compact paver are a machine frame, a drive motor, travel units, a receiving container located at the front in the paving direction for receiving paving material, in particular asphalt, a longitudinal conveying device with which paving material is conveyed from the receiving container to the rear in relation to the paving direction, a transverse distribution unit that is in particular height-adjustable in relation to the machine frame and which distributes the paving material on the ground surface transversely to the paving direction, a paving screed that is height-adjustable in relation to the machine frame for compacting and smoothing the transversally distributed paving material behind the transverse distribution unit in relation to the paving direction as well as an operating platform arranged behind the receiving container in the paving direction and mounted on the machine frame.

The compact paver generally comprises the essential elements of a tractor and a paving screed. The paving screed is mounted on the machine frame of the tractor in a known manner via corresponding towing arms so as to float during paving operating on the paving material and is pulled by the tractor over the paving material distributed on the ground surface. The paving screed is mounted in a height-adjustable manner vis-à-vis the machine frame. A cylinder-piston unit is generally provided for this purpose, which connects the towing arms in the rear area and/or to the paving screed itself for the purposes of the height adjustment in relation the machine frame. It is also known to vary the angle of application of the paving screed by means of a height adjustment of the towing points of the towing arms. The machine frame designates the essential supporting structure of the tractor. The tractor further comprises a drive motor, conventionally a diesel motor, which provides the required power for the paving operation including propulsion. The compact paver according to the invention is configured to be self-propelling and thus has travel units, e.g. crawler tracks or wheels, driven by the drive motor. The loading of the compact paver with paving material occurs via the receiving container, which is accordingly loaded during paving operation, e.g., by a suitable transport vehicle, in particular a truck or a wheel loader. The receiving container generally comprises adjustable side walls in order to move the paving material provided in the receiving container, e.g. precisely in the direction of the longitudinal conveying device. For this purpose, in particular the side walls of the container can be configured in such a manner that they can be swung up and/or slid in a horizontal direction. The longitudinal conveying device can be, e.g., a scraper conveyor or something similar arranged essentially in the middle in relation to the receiving container. The essential task of the longitudinal conveying device is the conveyance of the paving material within the compact paver from the receiving container in a rearward direction, in particular in order to be deposited on the ground surface in front of the paving screed in the paving direction. The provided transverse distribution device, in particular a known screw conveyor, which is in particular rotatable about a horizontal axis of rotation transverse to the working direction, permits a transverse distribution of the paving material delivered from the receiving container via the longitudinal conveying device, generally centrally. In order to make adjustments for different paving thicknesses, it is also already known to vary the height of the transverse distribution device vis-à-vis the machine frame or ground surface. In the case of greater paving thicknesses the transverse distribution device is raised in relation to the machine frame and vice versa. This adjustment can be, e g, manually actuable and driven by mechanical means, in particular by means of a cylinder-piston unit. The paving screed is constructed in a manner known in the prior art and comprises e.g. extendable screed parts, tamping devices, heating devices, narrowing parts, etc. It is essential that the paving screed is height-adjustable in relation to the machine frame in order to permit different paving thicknesses.

The operation of a generic compact paver is conducted by an operator located on the operating platform mounted on the machine frame. This operator frequently controls the compact paver during the paving process completely on his or her own and without the help of further auxiliary personnel. Thus, from the operating platform, the operator must monitor and/or control the fill level or amount of paving material in the receiving container, the loading process from the transport vehicle for filling the receiving container, the actual paving process—in particular with respect to paving thickness and paving quality—as well as the speed and direction of the compact paver. For the operation of the concrete working and driving functions of the compact paver, it is known to mount one or several suitable operating consoles, into which corresponding control commands can be entered, at a location that is easy to reach for the operator on the operating platform. In order to be able to perform all of these tasks adequately, it is particularly important that the driver has a good overview of the compact paver and its surroundings from the operating platform, in particular in different paving situations.

It is known in the prior art to configure the operating platform as a part of the machine frame. This makes a comparatively simple structure of the compact paver possible. In particular in paving situations with low ceilings, in spatially restricted working conditions or during normal operation, optimal viewing conditions are not always permitted and/or the driver can only operate the compact paver from a very uncomfortable position.

SUMMARY

The object of the invention is thus to indicate a compact paver that renders possible an improved overview of the working environment for the operator on the operating platform, in particular in different working situations.

This object is achieved with a compact paver and a method for operating a compact paver according to the independent claims. Preferred embodiments are indicated in the dependent claims.

According to an essential idea of the invention, the operating platform is configured to be height-adjustable in relation to the machine frame in such a way that the height adjustment of the operating platform is coupled to a height adjustment of the paving screed and/or a height adjustment of the transverse distribution device. According to the invention, the operating platform is thus mounted, on one side, in particular directly, on the machine frame in an adjustable manner in relation to the machine frame, at least in a vertical direction. On the other side, the height adjustment of the operating platform is not completely free, but occurs by means of a coupling of the height adjustment of the operating platform to the height adjustment of the paving screed and/or transverse distribution device. This enables the adjustment of the operating platform in relation to the machine frame—in particular in accordance with the paving thickness to be achieved and/or in accordance with the operating mode (in particular here a transport or paving mode)—without the operator having to perform a separate adjustment. The height adjustment of the operating platform is thus dependent on the height adjustment of the paving screed and/or transverse distribution device. Decisive for a height adjustment of the operating platform is thus a height adjustment of the transverse distribution device and/or the paving screed. This gives the operator of the compact paver an optimal overview of the working environment from the operating platform in different working conditions. At the same time, the operator is relieved of the burden of additionally having to perform a height adjustment for the operating platform independently of the height adjustment for the paving screed and/or transverse distribution device, which thus simplifies overall handling considerably.

In principle, it is possible for the operating platform to further comprise its own, separate drive for powering its height adjustment. The coupling with the height adjustment of the transverse distribution device and/or paving screed in this case can occur mechanically and/or electronically e.g. by means of a control unit. Preferably, the height adjustment of the operating platform is driven indirectly in such a manner that a drive unit for the height adjustment of the paving screed and/or transverse distribution device triggers the height adjustment of the operating platform, in particular at least partially. According to this embodiment, the operating platform thus does not have its own separate drive device for height adjustment, but is rather passively controlled by the height adjustment of the paving screed and/or transverse distribution device. The latter have their own drive unit for height adjustments, in particular respectively in the form of at least one cylinder-piston unit, an electric motor, etc. In the case of an adjustment of their height, the transverse distribution device and/or paving screed thus carry the operating platform along, at least partially. This does not mean that a height adjustment of the operating platform necessarily occurs every time there is a height adjustment of the transverse distribution device and/or paving screed. However, if the height of the operating platform is adjusted, then it is the result of a parallel height adjustment of the transverse distribution device and/or paving screed. This way, a separate adjustment drive solely for adjusting the height of the operating platform is not necessary and the operator does not have to trigger and control e.g. the height adjustment of the operating platform separately.

Ideally, the operating platform is mounted, in particular directly, on the machine frame in a height-adjustable manner, in particular by means of a linear sliding guide mechanism with an essentially vertical sliding direction. A sliding guide mechanism designates a guide mechanism with a guiding part along which a guided part is slid. This way, a particularly reliable height adjustment of the operating platform can be obtained. A mounting directly on the machine frame means here that the operating platform is connected to the machine frame directly by means of the guiding mechanism. The elements running inside the guiding mechanism on the machine frame thus move together with the rest of the operating platform, in particular in a vertical direction. This way, a relatively simple overall design can be achieved.

The transmission of the height-adjustment movement of the paving screed and/or transverse distribution device to the operating platform can be achieved in different ways. For example, it is possible to provide an adjustment transmission for the force transmission between the paving screed and/or the transverse distribution device, which translates the adjustment movement of the transverse distribution device and/or paving screed into a height adjustment of the operating platform. It is preferable, however, if a lifting tab is provided, in particular directly, on the paving screed and/or on the transverse distribution device, the lifting tab being configured in such a way that it respectively strikes a tab counterpart on the operating platform. By means of the lifting tab it is possible for the paving screed and/or the transverse distribution device, when a height adjustment is being carried out, to carry the operating platform along in the vertical direction or to limit its gravity-induced downward movement. The tab counterpart designates here the point or area on the operating platform that the paving screed and/or transverse distribution device contacts in order to adjust the height of the operating platform.

If both the paving screed and the transverse distribution device respectively have a lifting tab, the tab counterpart for the paving screed and the tab counterpart for the transverse distribution device are ideally arranged on the operating platform in an offset manner in relation to one another, in particular horizontally. As the paving screed in the rear area is pulled by the tractor, the tab counterpart for the paving screed is in particular arranged behind the tab counterpart for the transverse distribution unit in the paving direction. This way, the sequential arrangement of the tab counterparts mirrors the sequential arrangement of the paving screed and the transverse distribution unit in the paving screed, which gives rise to a relatively compact overall arrangement.

Ideally, the operating platform is not lowered below a maximum lowered position in relation to the machine frame of the tractor. This can be achieved advantageously by providing a lowering stop on the machine frame, which determines the maximum point to which the transverse distribution device and/or the operating platform can be lowered and against which the transverse distribution device and/or the operating platform strike when the maximum lowered position is reached. By means of the lowering stop, a decoupling of the positioning of the operating platform in relation to the height of the transverse distribution device and/or paving screed is possible when the latter are lowered. In other words, the operating platform is no longer adjustable in a downward direction in relation to the machine frame as of a certain lowered position. Additionally or alternatively, the lowering of the transverse distribution device can be limited by means of a lowering stop on the machine frame. Both alternatives have the advantage that in particular the mounting of the operating platform can be decoupled from the paving screed during a paving operation, in particular when the paving screed is lowered onto the paving material. This way, e.g. the weight of the operator no longer affects the floating paving screed so that the paving results achieved are more even.

Depending on the operational conditions—e.g. on whether the compact paver is in transport or in paving operation and/or on the paving thickness to be attained—the position of the paving screed in relation to the transverse distribution device in the vertical direction can vary significantly. In order to facilitate an optimal height of the operating platform in different scenarios, it is advantageous in accordance with the invention if the operating platform is coupled with both the height adjustment of the paving screed and the height adjustment of the transverse distribution device, the coupling preferably being configured in such a manner that, in the case of a lifting adjustment of the paving screed or of the transverse distribution device, the raised element can decouple the other element from its coupling with the operating platform. This means that, depending on the position of the transverse distribution device in relation to the paving screed and on the position of both in relation to the machine frame, the operating platform is held either by the paving screed or the transverse distribution device or the machine frame in its raised position. If both devices are holding the operating platform simultaneously and if one of these devices is then raised in the vertical plane, only this device triggers the height adjustment or raising of the operating platform. If both devices are holding the operating platform simultaneously and one of these devices is lowered in the vertical direction, the elevation of the operating platform does not change, as it is then held by the device positioned higher in the vertical plane. These functionalities are thus based on a virtual "zero position" in which both the transverse distribution device and the paving screed hold the operating platform in a vertical direction. The "zero position" thus lies in a vertical range. It is essential that the operating platform is held at its elevation within its vertical range of adjustment by the device positioned higher in relation to the zero position. This way, it is ensured that the operating platform is constantly raised to a sufficient degree in relation to the transverse distribution device and the paving screed.

The height adjustment of the transverse distribution device preferably comprises a guiding rail mechanism arranged, i.e. fixed, on the machine frame, in particular in the form of at least one and in particular at least two vertical guide rails, e.g. in the form of rail bars and/or elongated hole guiding mechanisms. This allows a robust adjustment movement in a vertical direction. The maximum travel distance of the transverse distribution device downward and/or upward can be limited by stops arranged on the rail guide.

Ideally, the operating platform engages in the same guiding device as the transverse distribution device on the machine frame. Preferably, the guiding device is a guiding rail mechanism. Both the transverse distribution device and the operating platform thus run in a common guiding rail. This way, the overall construction can again be simplified, as the transverse distribution device and the operating platform do not each require a separate guiding device. Alternatively, the transverse distribution device and the operating platform can each have their own rail guide, in particular respectively at least a pair of rail guides, on the machine frame. In this scenario there is a rail guide in which only the transverse distribution device runs, and a further, separate rail guide in which only the operating platform runs. This can be advantageous in particular in terms of an improved force distribution. However, a tab element is ideally provided in this variant as well. The tab of the transverse distribution device strikes a part of the operating platform from below. The tab here is not necessarily integrated in one of the rail guides, but is rather arranged separately from the latter, e.g. by means of a protrusion in the horizontal direction.

The paving screed is normally pulled by the tractor of the compact paver by means of two towing arms. The front area of these towing arms is preferably mounted in a height-adjustable fashion on the machine frame in order to set the angle of application of the paving screed in relation to the machine frame during the paving operation. Behind this in the paving direction is a further height-adjustment device by means of which the paving thickness can be varied and by means of which the paving screed can be raised further for transport purposes. In order to be able to compensate for the different possible positions of the paving screed rendered possible thereby in relation to the operating platform in an optimal fashion, the coupling between the paving screed and the operating platform is preferably configured in such a way that it compensates automatically or functions just as reliably in these different relative positions. It is thus preferable if a sliding roller is provided on the paving screed as a counterpart to the stop on the operating platform. The sliding roller is thus normally arranged on the upper side of the paving screed and constitutes the lifting tab on the paving screed. Its counterpart, a contact surface for the roller, is preferably provided on the underside of the operating platform as the tab counterpart in order to provide a rolling area for the sliding roller. Alternatively, this arrangement can also be reversed so that the sliding roller is arranged, in particular on the underside, of the operating platform and the paving screed comprises the corresponding contact surface. The advantage of this arrangement is that a translation of movement is rendered possible from the paving screed to the operating platform, even at different angles of application of the paving screed and at different raised positions.

There are in particular further possibilities for variation with respect to the concrete configuration of the operating platform. The latter particularly preferably comprises two operating steps that are arranged so as to be offset in relation to one another in the paving direction. An operating step designates a standing area on which the operator can stand during the paving process. Ideally, the front operating step in the paving direction is higher in the vertical direction than the rear operating step in the paving direction. This permits the operator to step up onto the operating platform easily from the rear. He also has the possibility, in particular when there is sufficient headroom, of standing at a relatively elevated position and of thus attaining a particularly good overview of the area in front of the compact paver in the paving direction as well as of the side and rear areas of the compact paver. Frequently, however, compact pavers are also used in spatially restricted conditions with less headroom. For these paving situations the operator then has the possibility of changing his usual position and moving to the rear, lower operating step in the paving direction from which relatively good viewing conditions still exist. In order to do this, the compact paver does not have to be modified. Additionally or alternatively, the front operating step in the paving direction is preferably positioned above the paving screed. The front operating step is thus preferably located above the paving screed in the vertical direction. The rear operating step in the paving direction, on the other hand, is preferably located behind the paving screed in the paving direction and, depending on its relative position, even at least partially at the level of the paving screed when viewed in the vertical direction. As the paving screed is by nature already always set at a certain elevation, it is even possible to arrange an operating step vertically at the level of the paving screed itself. Additionally or alternatively, the respective operating steps of the operating platform are also preferably configured as a rigid overall structure by means of a supporting frame, which renders e.g. the manufacturing process easier. In particular, however, the rear operating step in the paving direction can be adjustable between an operating position and a transport position, in particular in a pivotable manner. In the transport position, it is generally not possible for the operator to stand up on the corresponding operating step. The transport position is moreover characterized by a position that is as compact as possible against the rest of the machine in order to facilitate the transport of the compact paver. The front and rear operating steps thus particularly preferably constitute a rigid overall structure by means of a supporting frame.

In particular in order to accommodate different operating situations, the operating platform preferably comprises a multi-functional seat and/or back support. The seat and/or the back support is characterized in particular by an adjustability within the operating platform between two distinct operating positions, in particular a first position associated with the first operating step of the operating platform and a second position associated with the second operating step of the operating platform. This way, the driver can use the seat/back support both from the first operating step (first position) as well as from the second operating step (second position). The concrete configuration of the adjustability can also vary, although in particular an insertion of the seat/back support in one of two insertion positions has proven particularly workable. The operating platform according to this embodiment thus comprises two insertion positions into which the seat/back support can be optionally inserted and mounted on the operating platform. Additionally or alternatively, the position of the seat itself can be adjustable, in particular between a sitting operating position in which the driver can sit on the seat and a standing operating position in which the driver can lean his back against the seat while standing. For this purpose, the seat can comprise in particular a seat shell that is pivotable about a horizontal axis between these positions on a support frame. In order to realize these functionalities, the multi-functional seat can in principle comprise a supporting frame, in particular a supporting tube frame, on which the seat shell can be mounted and locked in these positions.

The operating platform preferably comprises an adjustable operating console by means of which at least the essential paver functions can be executed by an operator standing on the operating platform. The console can be mounted in particular on the supporting frame of the operating platform in an adjustable manner, e.g. by means of a pivot joint. The adjustability is preferably configured in such a way that the operating console is adjustable between a higher operating position in which it is positioned for use by an operator standing on the front operating step and a lower operating position in which it is positioned for use by an operator standing on the rear operating step. Ideally, the adjustment further occurs in coordination with the multi-functional seat and/or the back support. Additionally or alternatively, the adjustability of the operating console and the positioning of the multi-functional seat, in particular the seat shell, are configured in such a way, i.e. the operating console and the multi-functional seat are adjustable in relation to one another in such a way that in particular the horizontal distance of at least one operating element of the operating console in the higher operating position to the multi-functional seat, in particular its seat shell, in the first position is essentially smaller than the horizontal distance of the at least one operating element of the operating console in the lower operating position to the multi-functional seat in the second position, in particular its seat shell, by a factor of 0.9, in particular at least by a factor of 0.8 and especially by a factor of 0.7. This also creates very comfortable operating conditions for both operating positions. This also applies when a back support is used.

A further aspect of the invention lies in a method for operating a compact paver, in particular a compact paver in accordance with the invention, as described above. Essential steps of the method according to the invention for adjusting the height of an operating platform in relation to a machine frame are a lowering or raising of the transverse distribution device and a consequent carrying along of the operating platform and/or the lowering or raising of the paving screed and a consequent carrying along of the operating platform. It is thus essential that, when there is a height adjustment of the operating platform, the operating platform is driven by means of the transverse distribution device and/or by means of the paving screed and thus does not have its own drive for adjusting its height. This way, the overall construction of the compact paver is rendered simpler, as a separate drive device for the adjustment of the elevation of the operating platform is not necessary.

Ideally, when the transverse distribution device is raised, the operating platform is decoupled from the coupling between the operating platform and the paving screed, and when the paving screed is raised, the operating platform is decoupled from the coupling between the operating platform and the transverse distribution device. The background of this embodiment according to the inventive method is that, based on a zero position in which the operating platform is simultaneously held by both the transverse distribution device and the paving screen in its position of elevation, both a raising of the transverse distribution device as well as, alternatively, a raising of the paving screed are converted into an ascending movement of the operating platform. In other words, the device that is in a higher position in relation to the other device based on this zero position determines the elevation of the operating platform. This ensures that the operating platform has a minimum elevation depending on the elevation of the transverse distribution device and the paving screed. If, on the other hand, only the transverse distribution device or only the paving screed is lowered based on the zero position, the elevation of the operating platform does not change.

The operating platform is further preferably guided during its height adjustment in a guiding mechanism, in particular a linear guiding mechanism, in particular directly, on the machine frame and particularly preferably in a guiding mechanism shared with the transverse distribution device. This can occur, in particular, with the help of a sliding guiding mechanism. Alternatively, the transverse distribution device and the operating platform both have their own guiding mechanisms, in particular a linear guiding mechanism. This can be advantageous e.g. in view of the forces to be translated.

BRIEF DESCRIPTION OF THE DRAWINGS

In the following, the invention is described in greater detail by means of the embodiments shown in the figures.

Repetitive elements in the figures are not necessarily indicated in each figure with a reference number. The drawings show schematically:

FIG. 4A is a side view of the arrangement according to FIG. 1C with an operating platform, paving screed, transverse distribution device and a part of the machine frame;

FIG. 4B is an oblique perspective of a section of the arrangement shown in FIG. 4A;

FIG. 6 is a side view of the operating platform with an operating console in the higher operating position and a multi-functional seat in a higher position in the sitting operating position;

FIG. 7 is a side view of the operating platform shown in FIG. 6 with an operating console in the higher operating position and a multi-functional seat in a higher position in the standing operating position;

FIG. 8 is an oblique perspective of the operating platform shown in FIG. 7 from the rear left;

DETAILED DESCRIPTION

Figure 1A:
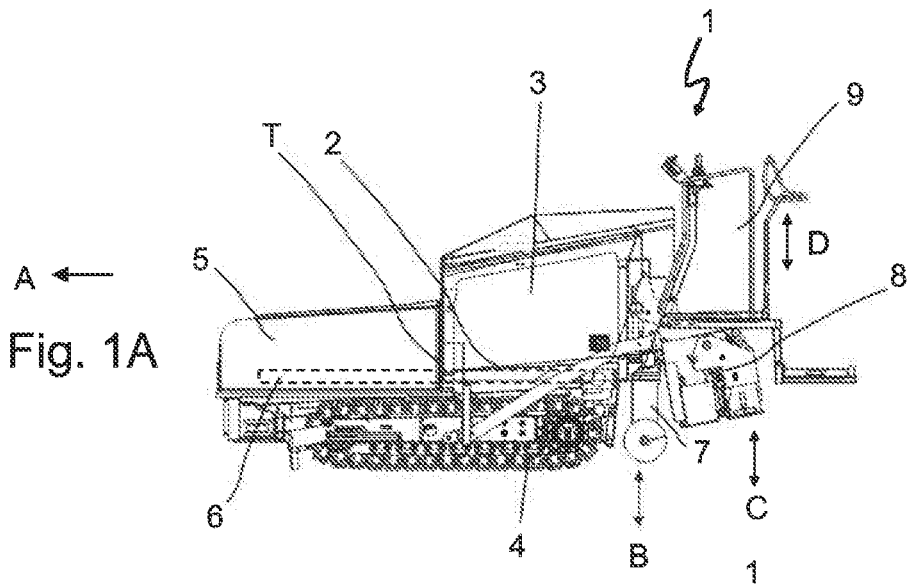
FIGS. 1A, 1B and 1C are side views of a compact paver with an operating platform, a transverse distribution device and a paving screed at different elevated positions.
Figure 1B:
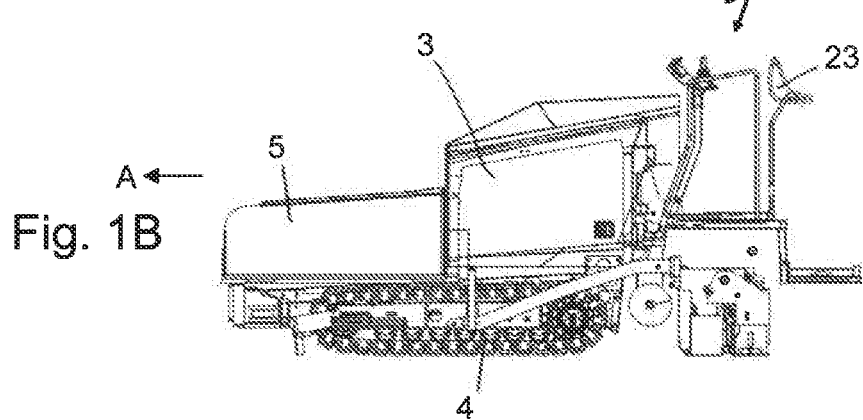
Figure 1C:
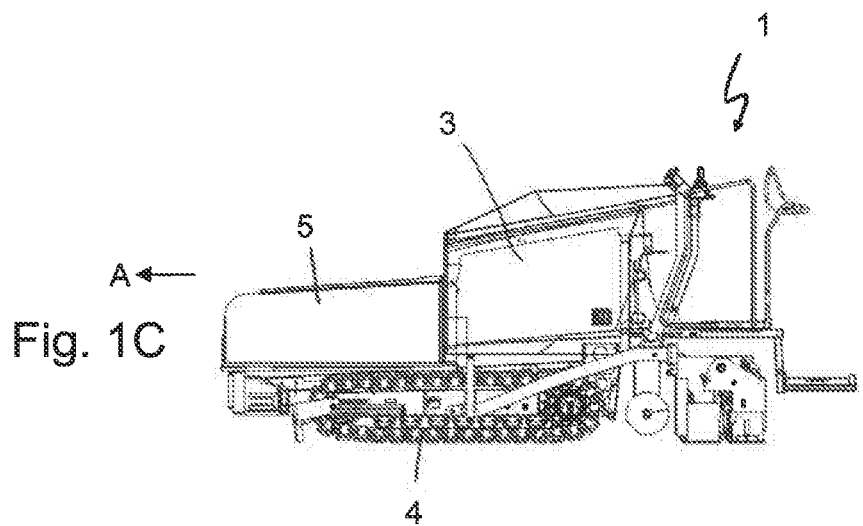

The essential elements of a compact paver 1 can be seen in FIGS. 1A, 1B and 1C. The compact paver 1 comprises a machine frame 2, a drive motor 3, travel units 4, in this specific example crawler tracks, a receiving container 5, a longitudinal conveying device 6 (merely suggested in FIG. 1A), e.g. a scraper floor, with which paving material can be conveyed from the receiving container 5 opposite the paving direction A rearward, a transverse distribution device 7 that is height-adjustable in relation to the machine frame 2 in the direction of the arrow B, specifically comprising a screw conveyor with rotational axes running horizontally and transversely to the paving direction A, a paving screed 8, provided for compacting and smoothing the transversely distributed paving material, that is height-adjustable in the direction of the arrow C in relation to the machine frame 2 and that is arranged behind the transverse distribution device 7 in the paving direction A, and an operating platform 9 that is height-adjustable within an adjustment range VB (FIG. 4C) in the direction of the arrow D in relation to the machine frame. In FIG. 1A, the transverse distribution device 7 is lowered e.g. to its maximum downward position and the paving screed 8 is swung up to its maximum upward position. By comparison, the transverse distribution device 7 in FIG. 1B is raised to its maximum elevated position and the paving screed 8 is lowered as far as it will go. Finally, in FIG. 1C both the transverse distribution device 7 and the paving screed 8 are in the maximum lowered position.

An essential aspect of the invention illustrated in this Fig. is that the height adjustment of the transverse distribution device 7 and the paving screed 8 affect the elevation of the operating platform 9 at least within the adjustment range VB. This is illustrated in particular by FIGS. 1A, 1B and 1C. In FIG. 1A, the underside of the operating platform 9 lies in manner described below in greater detail on the paving screed 8 which holds it in its elevated position. In FIG. 1B, on the other hand, the elevation of the operating platform 9 is determined by the raised transverse distribution device 7. Finally, in FIG. 1C the operating platform 9 is in a maximum lowered position, as are the transverse distribution device 7 and the paving screed 8. In this situation, the operating platform is finally held in its position by a stop tab on the machine frame 2, as further illustrated below.

It is essential here that the operating platform 9 in the present example does not have its own drive for height adjustment. Both the height adjustment of the operating platform 9 and the holding of the operating platform in its actual position essentially occur by means of the paving screed 8 and/or the transverse distribution device 7 and/or the tab on the machine frame. In order to clarify this point further, reference is made to FIG. 2B, which illustrates the basic arrangement of the mounting of these elements in greater detail.

Figure 2A:
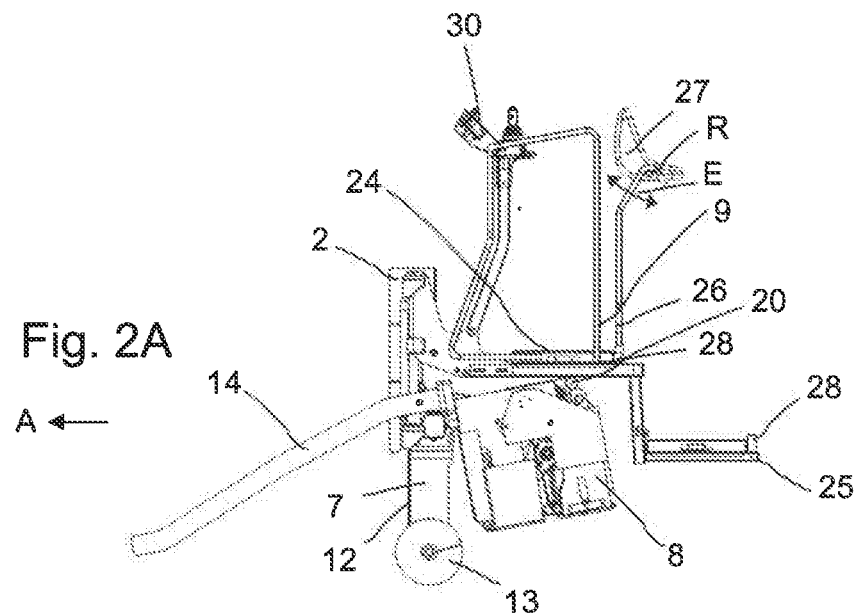
FIG. 2A is a side view of the transverse distribution device, the paving screed and the operating platform shown in FIG. 1A.
Figure 2B:
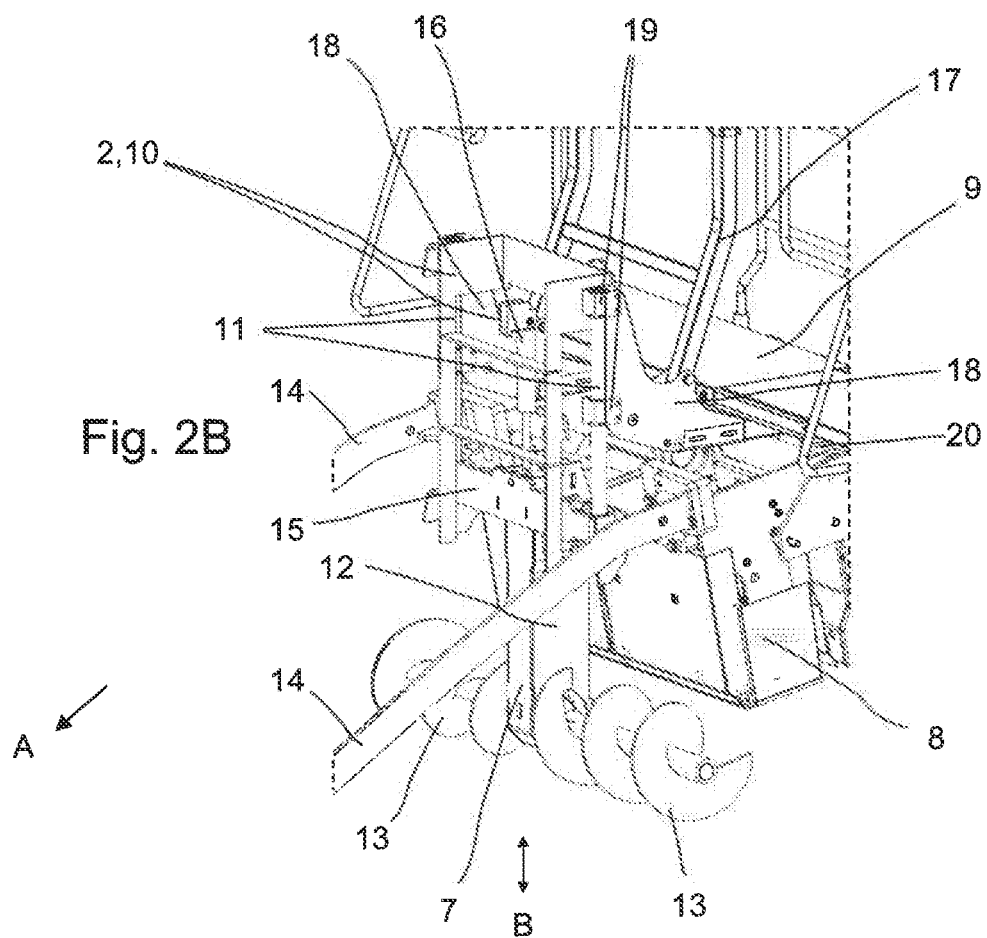
FIG. 2B is an oblique perspective of a section of the arrangement shown in FIG. 1A.

For the sake of clarity, the majority of the tractor T (FIG. 1A) of the compact paver is not visible in the view according to FIG. 2B. The frame-like support structure 10 shown in FIG. 2B is part of the machine frame 2 of the tractor T of the compact paver 1. The support structure 10 comprises mounting bars 11, which form part of a sliding guide mechanism described in greater detail below and which are fixed in relation to the machine frame 2. FIG. 2B further illustrates that the transverse distribution device 7 has two distribution screws 13 mounted on and protruding horizontally from a mounting arm 12, which extends downward in a vertical direction. These are rotatable about a horizontal axis running transversely to the paving direction A and thus distribute paving material on the ground surface in a lateral direction. Behind the transverse distribution device 7 in the working direction A, the paving screed 8, mounted in a known manner by means of towing arms 14 on the machine frame 2, is visible in FIG. 2B. The paving screed 8 is vertically pivotable about a horizontal pivot axis in a known manner by means of a cylinder-piston unit (not shown in the Figures) arranged between the machine frame 2 and the paving screed 8 or towing arms 14. The transverse distribution device 7 is mounted in a slidable manner in a vertical direction in the mounting bars 11 of the machine frame 2 with a mounting bracket 15 connected to the mounting arm 12. The sliding motion is driven by a cylinder-piston unit 16, which is connected on the side of the piston with the transverse distribution device 7 and on the side of the cylinder with the machine frame 2. If the cylinder-piston unit 16 is extended, the distribution screws 13 of the transverse distribution device are lowered and vice-versa.

The operating platform 9 is also connected to the mounting bars 11. It thus has two mounting plates 18 arranged on the supporting frame 17, each with two mounting braces 19 that are spaced apart from one another in the vertical direction. These grip the mounting bars 11 and are slidable along the mounting bars 11 in a vertical direction. Further details of the structure of the operating platform 9 are described in greater detail below. The transverse distribution device 7 and the operating platform 9 thus move in one and the same guiding mechanism, i.e. specifically in the mounting bars 11. Alternatively, the transverse distribution device 7 and the operating platform 9 can also have their own guide mechanisms on the machine frame 2, e.g. their own guide rails and/or bars and/or elongated hole guiding mechanisms. Ideally, these are provided in pairs. Preferably, at least one tab is provided on the transverse distribution device 7 (in addition to the mounting sleeves illustratively provided in the following for guiding purposes), e.g. in the form of a horizontal protrusion, which catches and carries along the operating platform 9, in a manner comparable to the present specific embodiment.

Figure 2C:
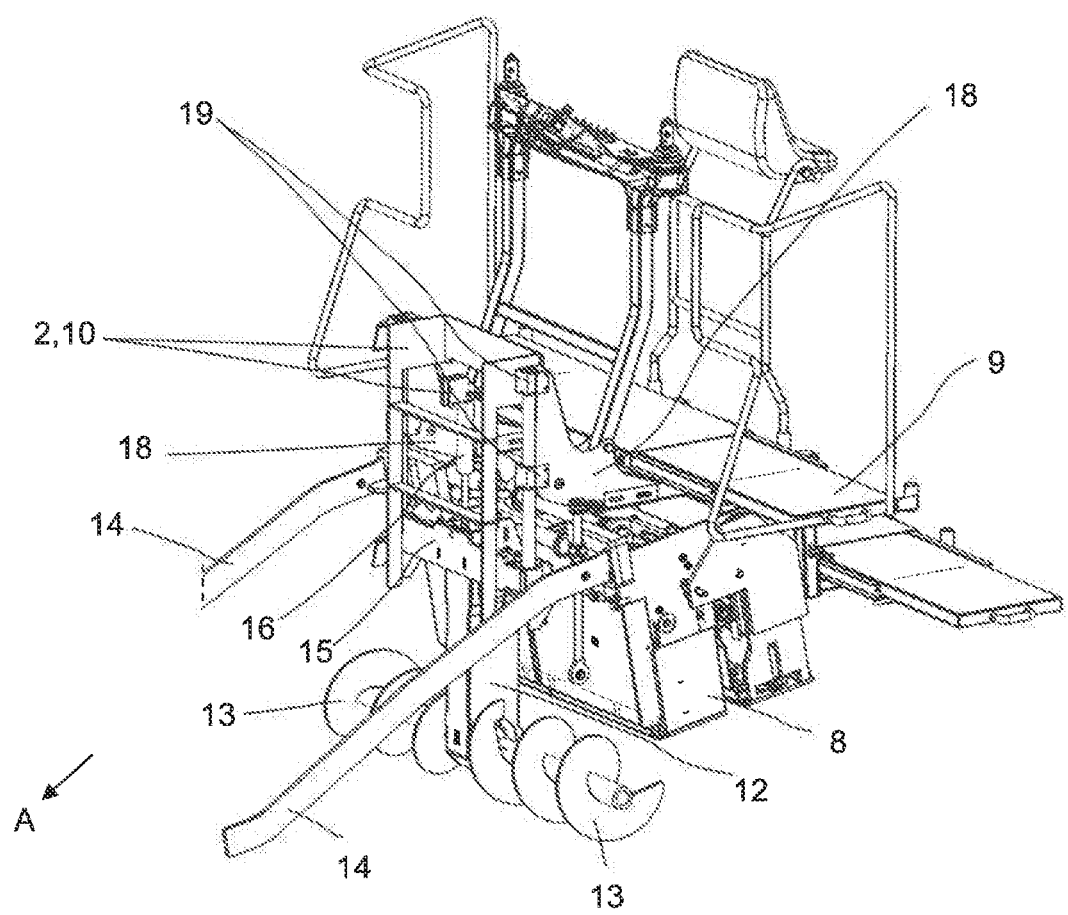
FIG. 2C is an oblique perspective of the arrangement shown in FIG. 1A.

The height adjustment of the operating platform 9 within the adjustment range VB (FIG. 2B) occurs passively or indirectly via the height adjustment of the transverse distribution device 7 and/or paving screed 9. In the position shown in FIG. 2B, the paving screed 8 is raised. It thus hits the underside of the operating platform 9, which it pushes upward in the direction of the arrow D when raised in the direction of the arrow C. Sliding rollers 20 are provided on the screed 8 for the impact against the operating platform (in FIGS. 2A and 2B, e.g., the outer left sliding roller 20 is visible). This is helpful as the pivoting movement of the paving screed is uneven for the linear elevation of the operating platform. There is a corresponding sliding surface on the underside of the operating platform 9 on which the sliding roller 20 can roll. If the paving screed 8 is lowered from the position shown in FIGS. 2A to 2C, the operating platform 9 is also lowered by the effect of gravity. In FIGS. 2A to 2C, the operating platform 9 is thus held at its elevation within the adjustment range VB by the paving screed 8.

Figure 3A:
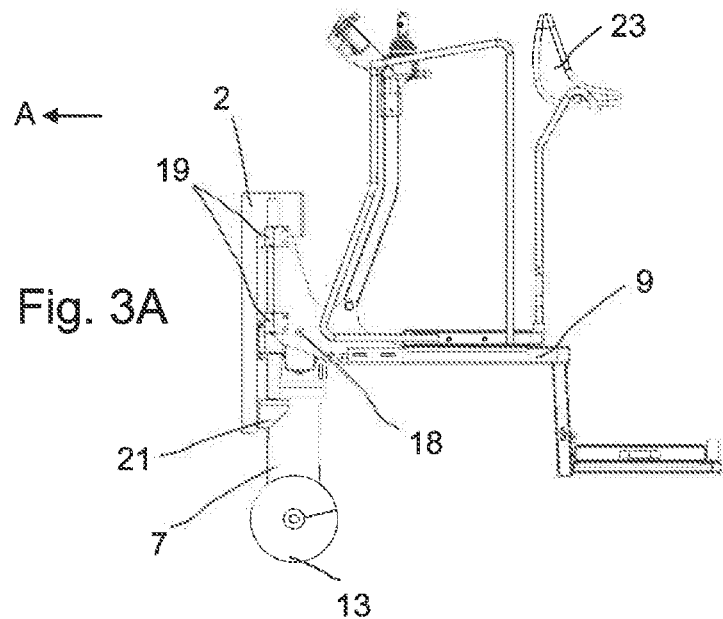
FIG. 3A is a side view of the arrangement shown in FIG. 1B with an operating platform, a transverse distribution device and a part of the machine frame.
Figure 3B:
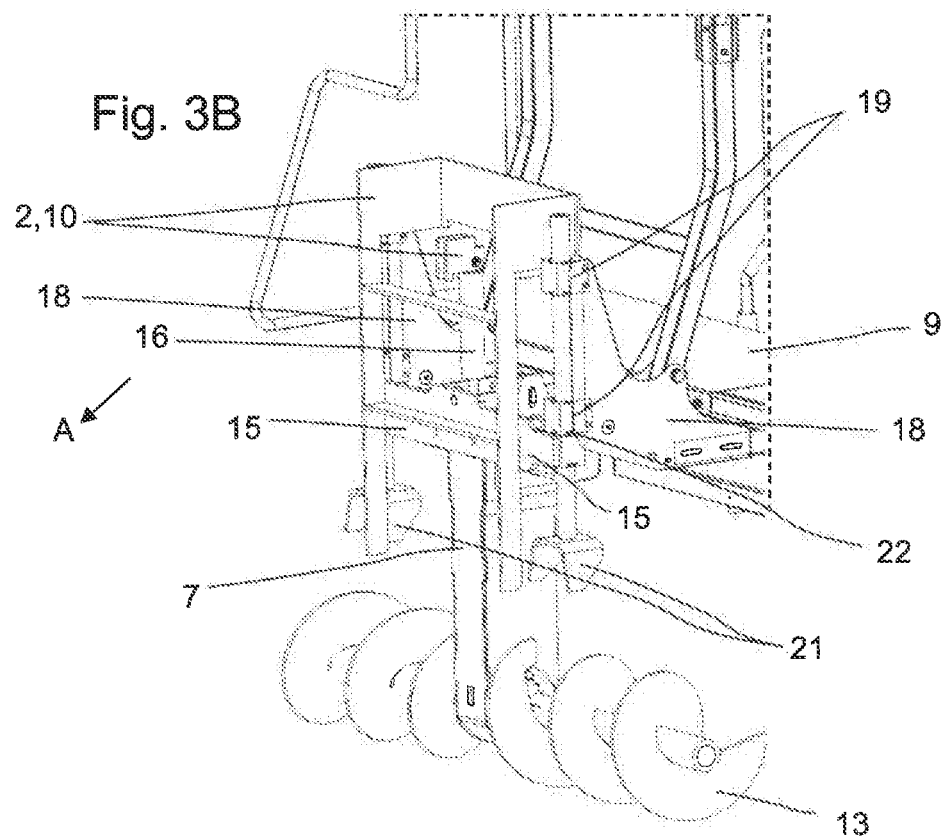
FIG. 3B is an oblique perspective of a section of the arrangement shown in FIG. 3A.
Figure 3C:
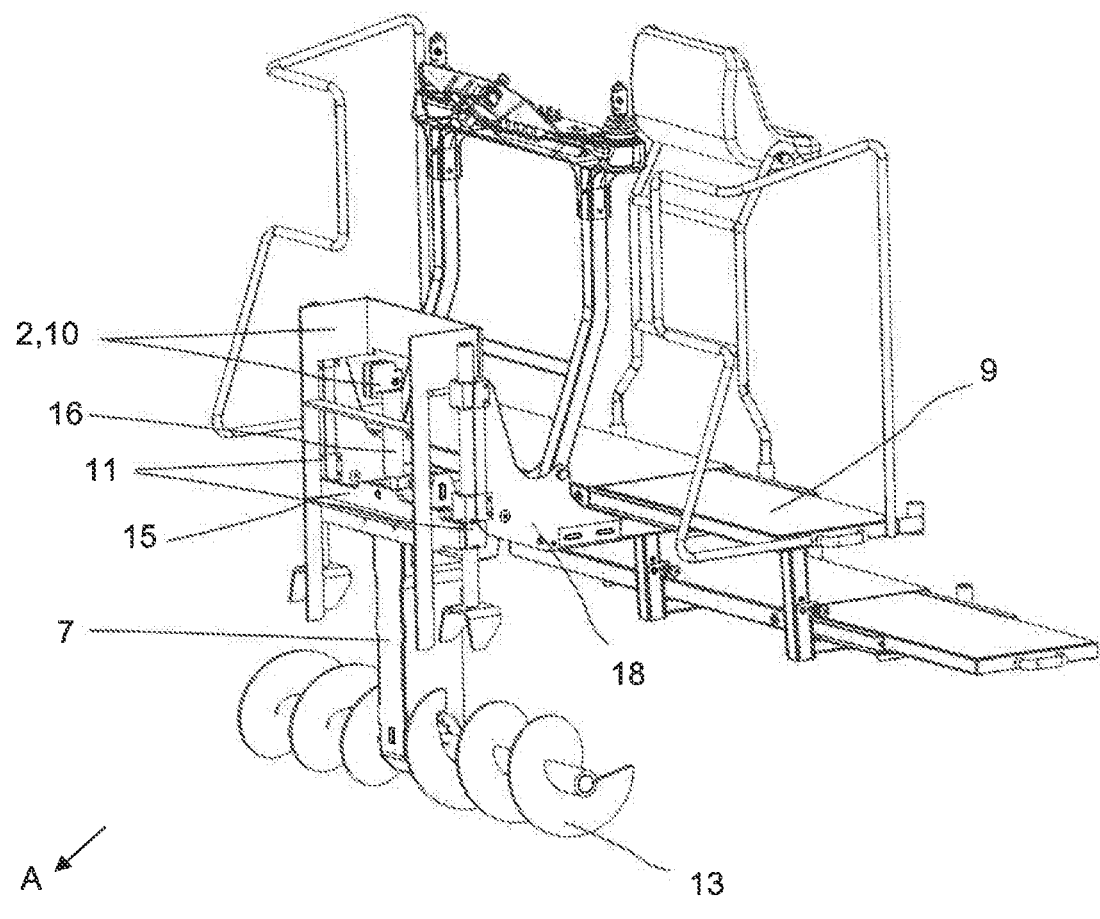
FIG. 3C is an oblique perspective of the arrangement according to FIG. 3A.

By contrast, FIGS. 3A to 3C show how the operating platform 9 is held at its elevated position within the adjustment range VB by the transverse distribution device 7. The paving screed 8 is pivoted downward, as shown in the corresponding FIG. 1B, so that it is no longer in contact with the underside of the operating platform 9. In the maximum lowered state the mounting bracket 15 of the transverse distribution device sits on the stop tabs 21, which are arranged at the lower end of the mounting bars 11 on the side of the machine frame 2. These thus block the downward path of the mounting bracket 15 on the mounting bars 11. If the mounting bracket 15 with its braces embracing the mounting bars 11 is pushed upward, these enter into contact, as shown e.g. in particular in FIG. 3C, with the mounting braces 19 of the operating platform 9. The mounting bracket 15 thus forms a stop 22 of the transverse distribution device 7 at this point on the operating platform 9. If the transverse distribution device 7 is moved along the supporting bars 11 by the cylinder-piston unit 16, the operating platform 9 is carried along. A separate drive for the height adjustment of the operating platform 9 is thus not necessary in accordance with this arrangement.

Figure 4C:
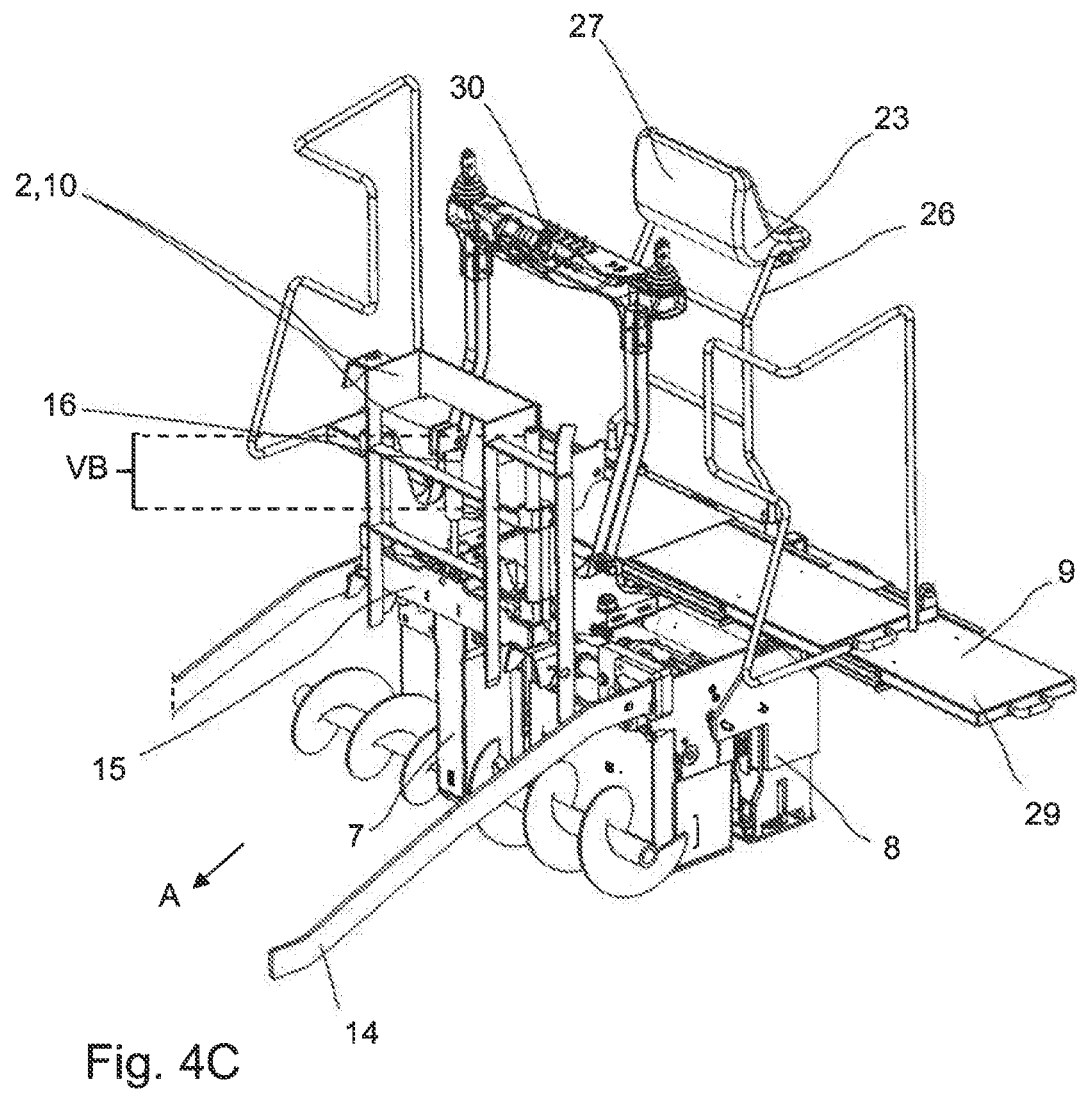
FIG. 4C is an oblique perspective of the arrangement according to FIG. 4A.

Finally, FIGS. 4A to 4C show, based on FIGS. 3A to 3C, the lowest position in the vertical direction for both the transverse distribution device 7 and the operating platform, which in this case are both consecutively hindered in their movement along the mounting bars 11 by the tab 21. In particular FIG. 4A illustrates that a raising of the paving screed 8 from its lowest position does not immediately trigger an upward movement of the operating platform 9. Only when the corresponding sliding roller 22, which constitutes the rear tab in the paving direction A, hits the underside of the operating platform 9 and the paving screed is raised still further, does it carry the operating platform 9 along and finally lifts it off the mounting bracket 15 of the transverse distribution device 7.

As a result, a total of two pairs of support braces 19 are arranged vertically spaced apart on the respective mounting bars. In the embodiment shown, the mounting bracket 15 strikes the respective lower support braces from below. The preferred embodiment shown in the Figs. can also be varied in that the mounting bracket 15 is arranged between the support braces 19 when viewed in the vertical direction and would thus strike against the higher support braces 19 from below. It goes without saying that, in this case, e.g. the tabs 21 would have to be moved up on the mounting bars 11 accordingly.

In particular the side views according to FIGS. 1A to 1C, 2A, 3A and 4A 6 illustrate further details regarding the specific structure of the operating platform 9. The latter comprises two levels 24 and 25 (FIG. 2A) vertically spaced apart from one another. Offset to the front in the paving direction A is the higher operating step 24, which is located in the vertical direction directly above the top side of the paving screed 8. Offset to the rear a second, lower operating step 25 is provided. Both operating steps each essentially form a flat and horizontal standing platform for the driver from which he/she can control the functions of the compact paver 1 during paving operation or transport. The rear lower level 25 in the paving direction can further be configured in such a manner that it can be pivoted about a horizontal axis running transversely to the paving direction up against the operating platform 9. This way, the transport length of the compact paver 1 can be reduced.

The compact paver 1 is controlled in particular by an operating console 30 that is arranged on the supporting frame 17 of the operating platform 9 and which rises from the front area of the upper level 24. Moreover, laterally adjustable extension pieces 29 are provided for the operating levels 24 and 25 with which the horizontal extension of the operating levels 24 and 25 can be increased or decreased. These extension pieces are thus slidable in a horizontal direction in relation to the supporting frame 17 (in FIG. 4C an extended position is shown).

FIG. 4C illustrates further that the operating console 30 can be configured so as to pivotable in relation to the rest of the operating platform 9. The operating console is further preferably configured in such a manner that the lower regions of its supporting columns extend obliquely in the paving direction. This way, an increased amount of foot room is attained in particular for an operator on the upper level 24.

The operating comfort of the inventive compact paver 1 is further improved by means of the configuration of the multi-functional seat 23 arranged on the operating platform 9. The latter is configured in such a way that it can be adapted in different ways to different working situations of the compact paver 1 in order to permit the most comfortable operating position possible for the operator. For this purpose, the multi-functional seat 23 essentially consists of a frame 26 and a seat shell 27. The seat shell 27 can be configured so as to be pivotable in relation to the frame 26 and can be pivoted downward about a pivot axis E from a standing operating position shown in FIG. 2A, in which the operator can lean with his/her back against the horizontal, protruding portion of the seat shell 27, into a sitting operating position in which the operator can sit on the swung-down seat shell. Additionally or alternatively, the same functionalities can be obtained by mounting the multi-functional seat 23 as a whole so as to be pivotable 180° about a vertical axis on the operating platform 9. This is achieved in accordance with the current embodiment particularly well by configuring the frame 26 of the multi-functional seat 23 so as to be insertable in two alternative insertion positions 28 on the operating platform 9. In the position shown in FIG. 2A, the multi-functional seat 23 is inserted in the insertion position 28 associated with the upper level 24. The multi-functional seat 23 is thus mounted in relation to the paving direction of the compact paver 1 in the rear area of the upper level 24. Alternatively, it can be extracted from this position and inserted in the insertion position 28 associated with the lower level 25. This is practical e.g. when the compact paver 1 is operated in a working environment with reduced headroom. Instead of or in addition to the multi-functional seat 23, it is possible to provide a back support against which an operator standing on the platform 9 can lean during operation of the paver. The back support thus does not fulfill the function of a seat in this case, but of a backrest.

Figure 5A:
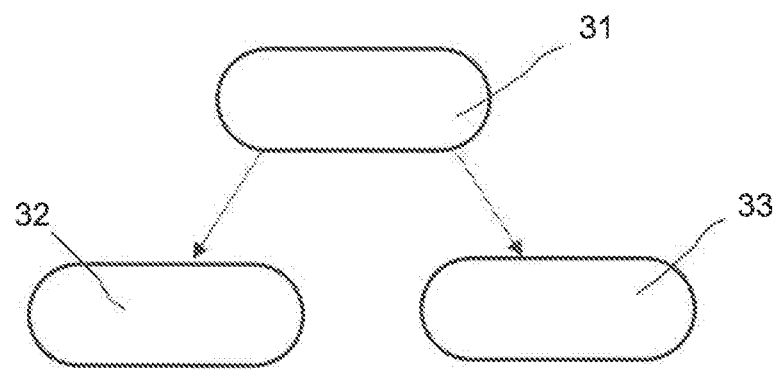
FIGS. 5A and 5B are process flow diagrams relating to methods according to the invention.
Figure 5B:
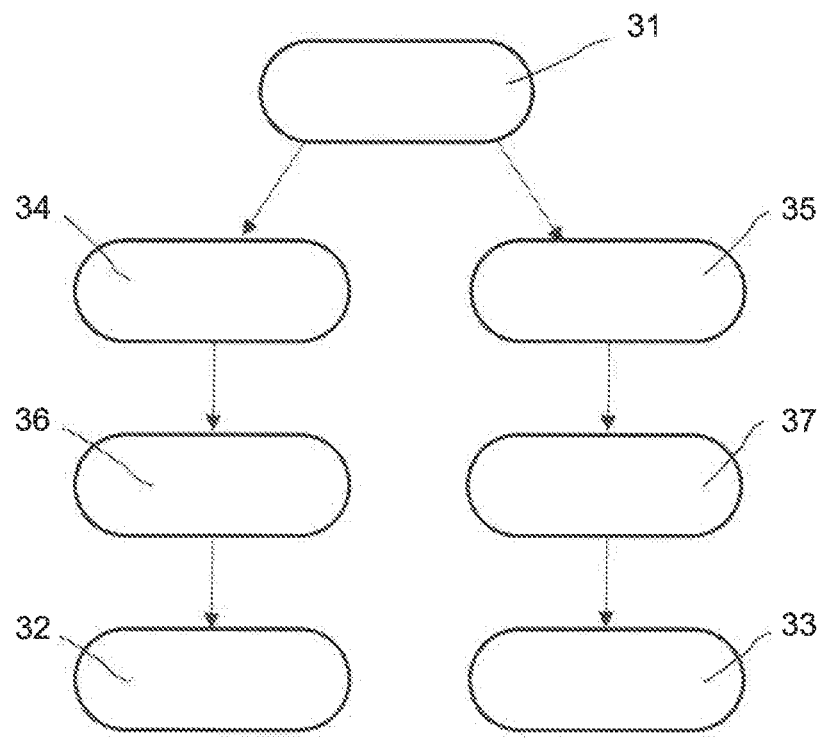

FIGS. 5A and 5B illustrate preferred methods for the operation of in particular a compact paver 1. The method according to FIG. 5A is essentially characterized in that a lowering or raising of the transverse distribution unit 7 in accordance with step 32 triggers the concomitant movement of the operating platform 9 in relation to the machine frame 2 based on the starting position shown in step 31. Additionally or alternatively, it is possible that a lowering or raising of the paving screed 8 causes the concomitant movement 33 of the operating platform. As already shown in particular in the preceding Figs., it is also possible to execute steps 32 and 33 simultaneously or consecutively.

In the method according to FIG. 5B, it is additionally provided that, in case of a raising 34 of the transverse distribution unit 7 or in the case of a raising 35 of the paving screed 8, a decoupling 36 of the operating platform 9 from its coupling with the paving screed 8 or a decoupling 37 of the operating platform from a coupling of the operating platform 9 with the transverse distribution device 7 and, accordingly, a raising of the operating platform 9 in accordance with steps 32 or 33 occur.

In principle, the transverse distribution device 7 and the operating platform 9 can also further be guided in relation to the machine frame 2 by means of their own guiding mechanisms. This can be a preferred solution e.g. when an optimal distribution of forces is desired. Preferably, however, the adjusting of the transverse distribution device 7 and the operating platform 9 vis-à-vis the machine frame 2 occurs by means of one and the same, i.e. a common guiding mechanism, in particular a guide rail in accordance with FIGS. 1A to 4C.

Essential for the method according to the invention is that the height adjustment of the operating platform 9 is not caused by its own separate drive, but ultimately relies on the height adjustment of the transverse distribution device 7 or of the paving screed 8 and thus on their respective adjustment drives.

Figure 9:
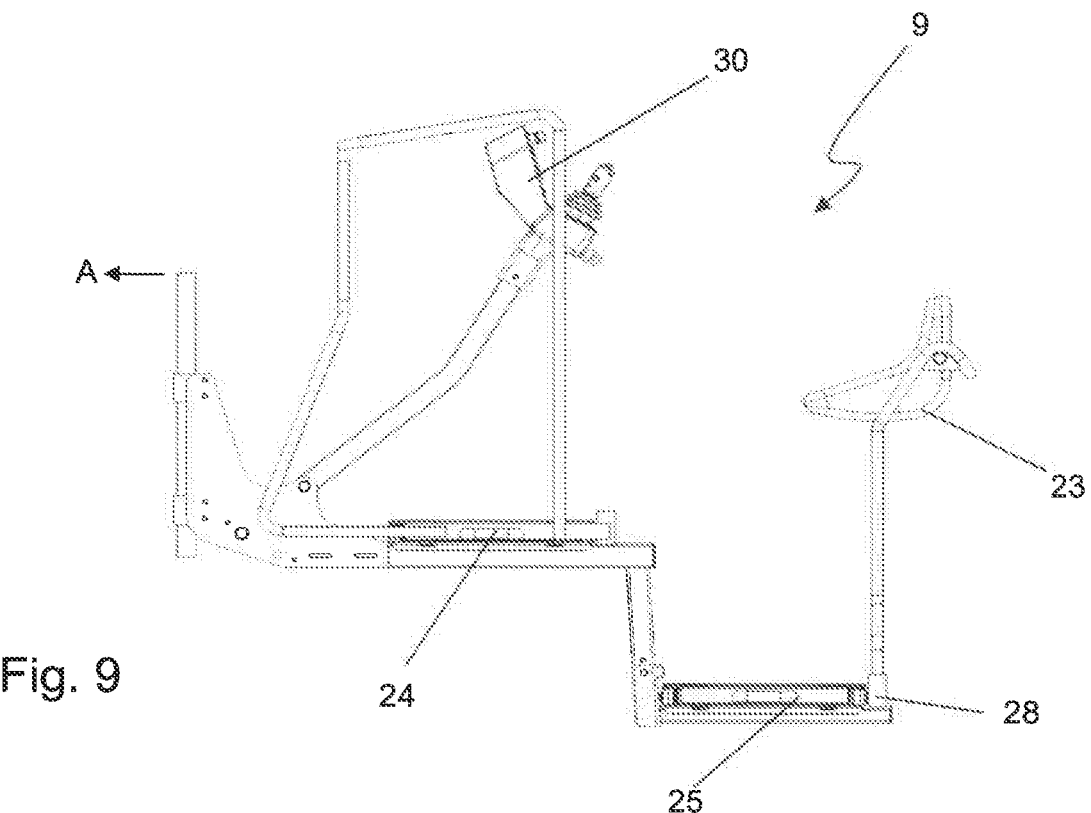
FIG. 9 is a side view of the operating platform with an operating console in the lower position and a multi-functional seat in the lower position in the sitting operating position.
Figure 10:
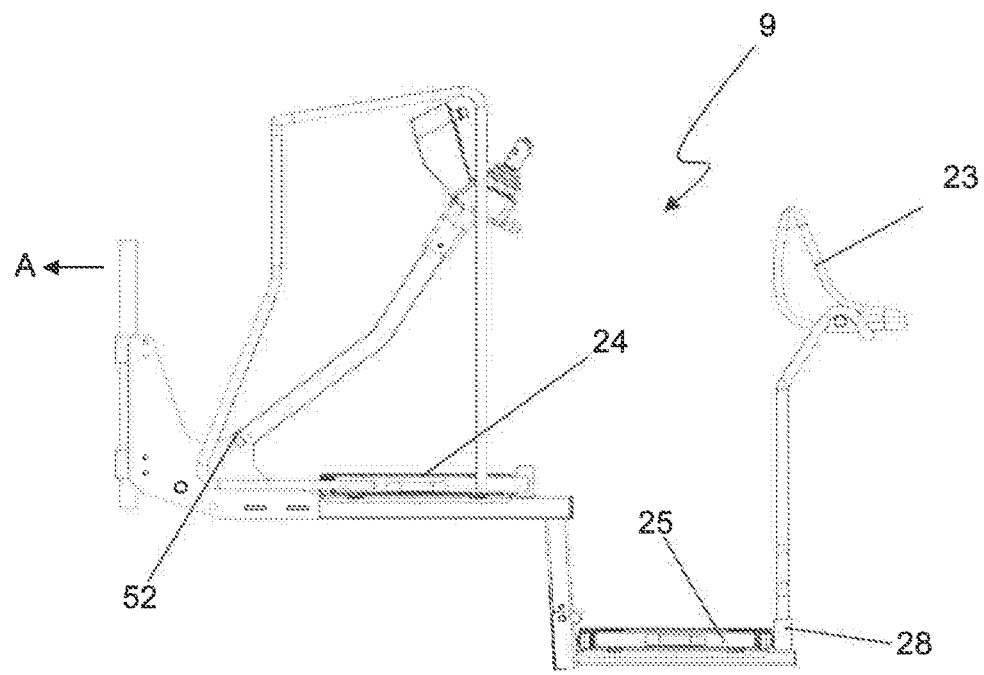
FIG. 10 is a side view of the operating platform with an operating console in the lower position and a multi-functional seat in the lower position in the standing operating position.

FIGS. 6 to 10 illustrate details of the operating platform 9. In addition to the preceding exposition, FIGS. 6 to 10 illustrate that not only the position of the seat 23 on the supporting frame 50 of the operating platform is adjustable in relation to the upper operating platform 24 and the lower operating platform 25, but also the position of the operating console 30 with the at least one operating element 51. For this purpose, the operating console 30 is connected with the supporting frame in the foot region by means of a pivot joint 52. A comparison in particular of FIGS. 6 and 7 with FIGS. 9 and 10 illustrates that this advantageously enables the creation of very similar operating conditions for the driver, regardless whether the latter is operating the compact paver 1 from the upper operating level 24 or the lower operating level 25 of the operating platform 9.

FIGS. 9 and 10 further illustrate, for example, that the seat with its supporting frame can be inserted so as to be pivotable 180° so that its back support can be used as a leaning support for a standing operator. The seat and the seat shell, however, can also be configured so as to be pivotable about a horizontal axis between a sitting operating position and a leaning position.

FIG. 8 illustrates that several insertion positions 28 can be provided for the seat 23 for each operating level (for the upper operating level in the embodiment shown) so that the latter can be arranged in a total of three laterally offset positions in this case. The individual insertion positions 28 of the upper operating level 24 are spaced apart evenly in the horizontal direction for this purpose.

The lower operating level 24 is further configured so that it can be folded against the machine. It can thus be swung up into the position shown in the Figs. in order to reduce the overall length of the machine, e.g. for transport purposes.

The upper operating level 24 and the lower operating level 25 are spaced apart in the vertical direction in particular by at least 20 cm.

FIG. 8 illustrates further that the operating element 51 is provided twice on the operating console 9, respectively approximately about a third of the console's width away from the edge of the console and spaced apart from one another transversely to the working direction. This way, similar operating conditions can be guaranteed for each of the insertions positions on the upper operating level 24 by means of the functionally redundant operating elements 51.

Instead of the seat 23 shown in FIGS. 6 to 10, a sole back support can be used with the same positional variability. What such a back support might look like specifically can be partially seen in FIG. 10, which shows the seat 23 in a lean or back support position. If the seating surface of the seat 23 is omitted from this embodiment, the result is a sole back support.

What is claimed is:
1. A compact paver, comprising:
   a machine frame;
   a drive motor;
   travel units;
   a receiving container arranged at the front in the paving direction for receiving paving material;
   a longitudinal conveying device, with which the paving material is conveyable from the receiving container rearward in relation to the paving direction;
   a transverse distribution unit that is height-adjustable in relation to the machine frame and with which the paving material is distributable transversely to the paving direction on the ground surface;
   a paving screed that is height-adjustable in relation to the machine frame for compacting and smoothing the paving material distributed laterally on the ground surface behind the transverse distribution device in the paving direction;

an operating platform mounted on the machine frame and arranged behind the receiving container in the paving direction, wherein the operating platform is height-adjustable in relation to the machine frame in such a way that the height adjustment of the operating platform is coupled to a height adjustment of the paving screed and/or to a height adjustment of the transverse distribution device; and wherein, for the height adjustment of the operating platform, a lifting tab, configured to contact a tab counterpart on the operating platform, is provided on each of the paving screed and the transverse distribution device, respectively.

2. The compact paver according to claim 1, wherein the height adjustment of the operating platform is driven indirectly in such a way that a drive device for the height adjustment of the paving screed and/or the transverse distribution device triggers the height adjustment of the operating platform.

3. The compact paver according to claim 1, wherein the operating platform is mounted directly on the machine frame in a height-adjustable manner by a linear guiding mechanism with an essentially vertical displacement path.

4. The compact paver according to claim 1, wherein the paving screed and the transverse distribution device are configured for height adjustment of the operating platform alternatively.

5. The compact paver according to claim 1, wherein a tab counterpart for the paving screed and a tab counterpart for the transverse distribution device are arranged on the operating platform in an offset manner such that the tab counterpart for the paving screed is arranged behind the tab counterpart for the transverse distribution device in the paving direction.

6. The compact paver according to claim 1, wherein a lowering stop is provided on the machine frame which determines the maximum lowered state of the transverse distribution device and/or of the operating platform and against which the transverse distribution device and/or the operating platform strikes when the maximum lowered position in relation to the machine frame is reached.

7. The compact paver according to claim 1, wherein the height adjustment of the operating platform is coupled to both the height adjustment of the paving screed and the height adjustment of the transverse distribution device, wherein the coupling is configured in such a way that the paving screed or the transverse distribution device can respectively decouple each other from their respective connections with the operating platform when raised.

8. The compact paver according to claim 1, wherein the height adjustment of the transverse distribution device comprises a rail guide connected to the machine frame.

9. The compact paver according to claim 1, wherein a sliding roller is provided on the paving screed for contacting the underside of the operating platform.

10. The compact paver according to claim 1, wherein the operating platform comprises two operating steps arranged in an offset manner in relation to one another in the paving direction, and wherein the operating platform comprises at least one of the following features
a front operating step in the paving direction is positioned higher in the vertical direction than a rear operating step in the paving direction;
the front operating step in the paving direction is positioned above the paving screed;
the operating steps form an overall rigid structure by a support frame; and
the front and rear operating steps are arranged one directly behind the other in the working direction and/or form an overall rigid structure by a support frame.

11. The compact paver according to claim 1, wherein the operating platform has a multi-functional seat and/or a back support comprising at least one of the following features
the seat and/or the back support is adjustable by insertion between two operating positions within the operating platform, a first position associated with a first operating step and a second position associated with a second operating step; and
the seat is movable between a sitting operating position and a standing operating position and is pivotable about a horizontal axis.

12. The compact paver according to claim 1, wherein an adjustable operating console is arranged on the operating platform, comprising at least one of the following features
the operating console is mounted on a supporting frame of the operating platform in an adjustable manner; and
the operating console is adjustable between an upper operating position, in which the operating console is positioned for operation by an operator on the front operating step, and a lower operating position, in which the operating console is positioned for operation by an operator on the rear operating step.

13. A method for operating a compact paver, comprising:
obtaining the compact paver, wherein the compact paver comprises
a machine frame;
a drive motor;
travel units;
a receiving container arranged at the front in the paving direction for receiving paving material;
a longitudinal conveying device, with which the paving material is conveyable from the receiving container rearward in relation to the paving direction;
a transverse distribution unit that is height-adjustable in relation to the machine frame and with which the paving material is distributable transversely to the paving direction on the ground surface;
a paving screed that is height-adjustable in relation to the machine frame for compacting and smoothing the paving material distributed laterally on the ground surface behind the transverse distribution device in the paving direction; and
an operating platform mounted on the machine frame and arranged behind the receiving container in the paving direction, wherein the operating platform is height-adjustable in relation to the machine frame in such a way that the height adjustment of the operating platform is coupled to a height adjustment of the paving screed and/or to a height adjustment of the transverse distribution device;
lowering or raising the transverse distribution device and, in so doing, carrying along the operating platform, and/or lowering or raising the paving screed and, in so doing, carrying along the operating platform; and
wherein the operating platform is removed from the coupling of the operating platform with the paving screed when the transverse distribution device is raised or in that the operating platform is removed from the coupling of the operating platform with the transverse distribution device when the paving screed is raised.

14. The method according to claim 13, wherein the operating platform is guided in a linear guiding mechanism, on the machine frame during a height adjustment.

15. A compact paver, comprising:
a machine frame;
a drive motor;
travel units;
a receiving container arranged at the front in the paving direction for receiving paving material;
a longitudinal conveying device, with which the paving material is conveyable from the receiving container rearward in relation to the paving direction;
a transverse distribution unit that is height-adjustable in relation to the machine frame and with which the paving material is distributable transversely to the paving direction on the ground surface;
a paving screed that is height-adjustable in relation to the machine frame for compacting and smoothing the paving material distributed laterally on the ground surface behind the transverse distribution device in the paving direction;
an operating platform mounted on the machine frame and arranged behind the receiving container in the paving direction, wherein the operating platform is height-adjustable in relation to the machine frame in such a way that the height adjustment of the operating platform is coupled to a height adjustment of the paving screed and/or to a height adjustment of the transverse distribution device;
wherein the operating platform comprises two operating steps arranged in an offset manner in relation to one another in the paving direction, and
wherein the operating platform comprises at least one of the following features
a front operating step in the paving direction is positioned higher in the vertical direction than a rear operating step in the paving direction;
the front operating step in the paving direction is positioned above the paving screed;
the operating steps form an overall rigid structure by a support frame; and
the front and rear operating steps are arranged one directly behind the other in the working direction and/or form an overall rigid structure by a support frame.

16. A compact paver, comprising:
a machine frame;
a drive motor;
travel units;
a receiving container arranged at the front in the paving direction for receiving paving material;
a longitudinal conveying device, with which the paving material is conveyable from the receiving container rearward in relation to the paving direction;
a transverse distribution unit that is height-adjustable in relation to the machine frame and with which the paving material is distributable transversely to the paving direction on the ground surface;
a paving screed that is height-adjustable in relation to the machine frame for compacting and smoothing the paving material distributed laterally on the ground surface behind the transverse distribution device in the paving direction;
an operating platform mounted on the machine frame and arranged behind the receiving container in the paving direction, wherein the operating platform is height-adjustable in relation to the machine frame in such a way that the height adjustment of the operating platform is coupled to a height adjustment of the paving screed and/or to a height adjustment of the transverse distribution device; and
wherein the coupling is configured in such a way that the paving screed or the transverse distribution device can respectively decouple each other from their respective connections with the operating platform when raised.

* * * * *